(12) United States Patent
Bendahan

(10) Patent No.: US 7,539,283 B2
(45) Date of Patent: May 26, 2009

(54) COMBINED COMPUTED TOMOGRAPHY AND NUCLEAR RESONANCE FLUORESCENCE CARGO INSPECTION SYSTEM AND METHOD

(75) Inventor: Joseph Bendahan, San Jose, CA (US)

(73) Assignee: GE Homeland Protection, Inc., Newark, CA (US)

(*) Notice: Subject to any disclaimer, the term of this patent is extended or adjusted under 35 U.S.C. 154(b) by 84 days.

(21) Appl. No.: 11/843,359

(22) Filed: Aug. 22, 2007

(65) Prior Publication Data

US 2008/0181357 A1    Jul. 31, 2008

Related U.S. Application Data

(63) Continuation-in-part of application No. 11/654,251, filed on Jan. 17, 2007.

(51) Int. Cl.
    *G01N 23/04* (2006.01)
(52) U.S. Cl. .......................................... 378/57; 378/44
(58) Field of Classification Search ............... 378/4–22, 378/44, 45, 51–57, 86–89, 193–197; 250/370.01, 250/370.08, 370.09
    See application file for complete search history.

(56) References Cited

U.S. PATENT DOCUMENTS

| | | | |
|---|---|---|---|
| 4,941,162 A | 7/1990 | Vartsky et al. | 378/3 |
| 5,115,459 A | 5/1992 | Bertozzi | 378/88 |
| 5,323,004 A | 6/1994 | Ettinger et al. | 250/336.1 |
| 5,420,905 A | 5/1995 | Bertozzi | 378/88 |
| 5,600,303 A | 2/1997 | Husseiny et al. | 340/568.1 |
| 5,642,393 A | 6/1997 | Krug et al. | 378/57 |
| 5,838,759 A * | 11/1998 | Armistead | 378/57 |
| 6,018,562 A | 1/2000 | Willson | 378/9 |
| 6,088,423 A | 7/2000 | Krug et al. | 378/57 |
| 6,175,609 B1 | 1/2001 | Edic et al. | 378/7 |
| 6,345,113 B1 | 2/2002 | Crawford et al. | 382/131 |
| 6,442,233 B1 | 8/2002 | Grodzins et al. | 378/57 |
| 7,120,226 B2 | 10/2006 | Ledoux et al. | 378/57 |
| 2004/0109532 A1 | 6/2004 | Ford et al. | |
| 2006/0104414 A1 | 5/2006 | Mayo | |
| 2006/0193433 A1 | 8/2006 | Ledoux | |
| 2007/0096036 A1 | 5/2007 | Kang et al. | |

FOREIGN PATENT DOCUMENTS

| | | |
|---|---|---|
| DE | 102004031130 | 1/2006 |
| WO | WO 2004/072685 | 8/2004 |

* cited by examiner

*Primary Examiner*—Courtney Thomas
(74) *Attorney, Agent, or Firm*—Global Patent Operation

(57) ABSTRACT

Methods and systems for scanning a container for contraband are provided. In one aspect, a method includes scanning the container using computed tomography (CT) to identify a location of an item of interest, determining a nuclear resonance fluorescence (NRF) scan configuration based on the location of the item of interest, positioning the container in the NRF scan configuration, irradiating the item of interest, detecting gamma rays emitted from the item of interest to generate signals representative of the detected gamma rays, and analyzing the generated signals to determine a presence of contraband.

20 Claims, 7 Drawing Sheets

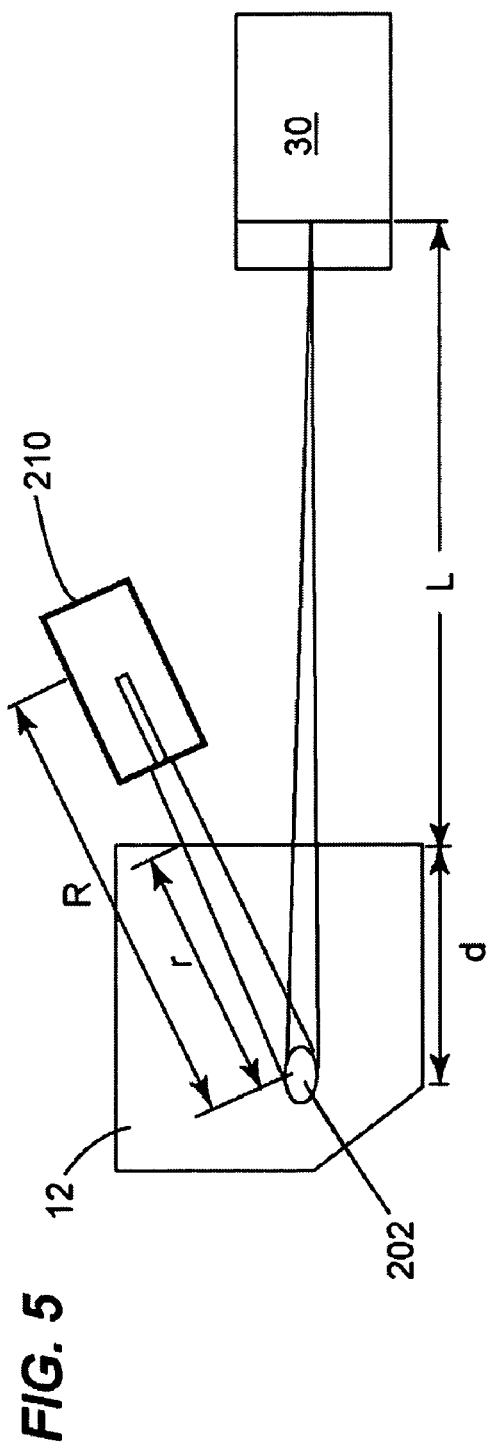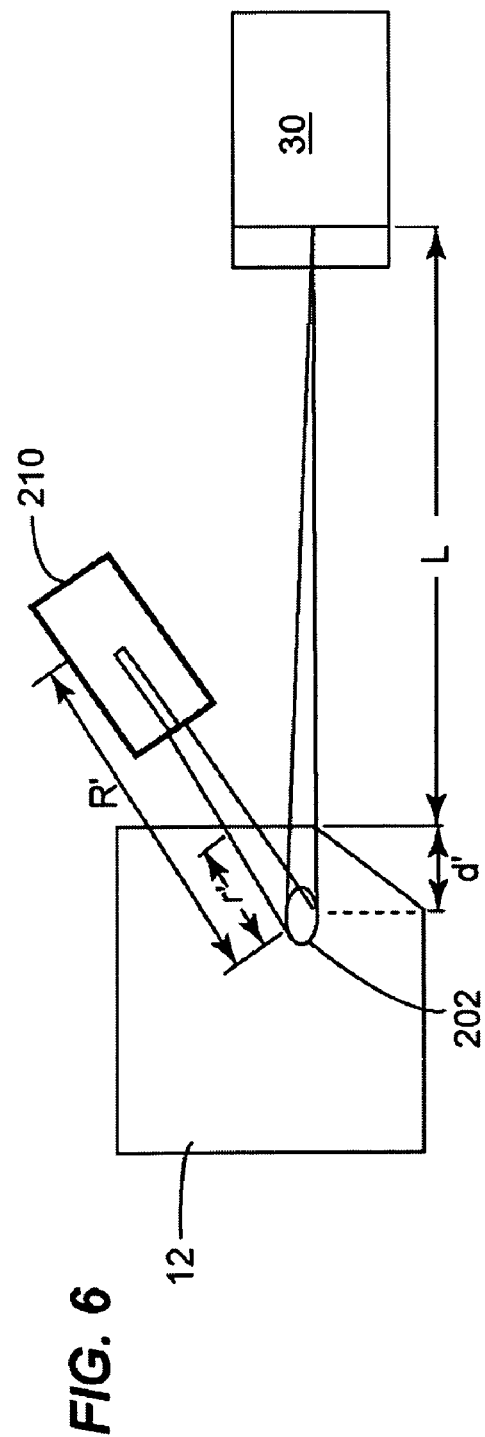
FIG. 5
FIG. 6

COMBINED COMPUTED TOMOGRAPHY AND NUCLEAR RESONANCE FLUORESCENCE CARGO INSPECTION SYSTEM AND METHOD

CROSS REFERENCE TO RELATED APPLICATIONS

This application is a continuation-in-part of prior U.S. patent application Ser. No. 11/654,251, filed Jan. 17, 2007, which is hereby incorporated by reference in its entirety.

BACKGROUND OF THE INVENTION

The field of the invention relates generally to cargo inspection systems and, more particularly, to cargo inspection systems incorporating computed tomography (CT) and nuclear resonance fluorescence (NRF) to inspect cargo for contraband and methods for operating the same.

Since the events of Sep. 11, 2001, the Department of Homeland Security has increased security dramatically in U.S. airports. Such security efforts include screening passengers and carry-on bags and luggage for contraband including explosive materials.

Many of these systems employ single or few multi-view X-ray transmission technology. Although these systems enable the detection of weapons and blades, for example, they lack the capability of detecting explosives with a low false alarm rate.

CT provides a quantitative measure of material characteristics, regardless of location or the superposition of objects; a substantial advantage over conventional and multi-view X-ray transmission and radioisotope-based imaging systems. In a CT scanner, a large number of precise X-ray "views" are obtained at multiple angles. These views are then used to reconstruct planar or volumetric images. The image is a mapping of the X-ray mass attenuation value for each volume element (or voxel) within the imaged volume.

Systems employing CT are used widely in airports around the world on checked luggage to detect explosives that pose a threat to aviation safety. These systems employ an X-ray source and opposing detectors that rotate around a horizontal axis while the suitcase is translated along the same horizontal axis.

While such screening processes are reliable and suitable for break-bulk cargo, there is a need for inspecting large crates, pallets, and containers that are too large to inspect with conventional checked-luggage scanning systems. Further, it is too time consuming to remove and inspect the contents of each cargo container before loading the container for delivery to the destination. Only a portion of air cargo containers is inspected using currently available technologies including manual inspection, canine inspection, and/or trace detection. It is recognized that these inspection methods must be improved for automation and/or to obtain greater detection.

At least some known CT scanning systems are capable of detecting most explosives and other contraband. However, false alarms are occasionally raised due to similarities shared by explosives and other contraband and benign materials. There is a need for a system based on a different technology to clear most of the false alarms.

An imaging technique known as nuclear resonance fluorescence (NRF) is capable of producing a three-dimensional elemental image of an object by using a collimated beam of high-energy photons and an array of collimated detectors focused at all cargo depths. The high-energy photons cause nuclear states in the object elements to fluoresce. The identification of the elemental composition of an object is based on the characteristic energy of the gamma-ray energies re-emitted by the object and their intensities. The material identification is based on the elemental composition of the inspected object.

With least some known NRF scanning systems, inspection of large objects, such as cargo containers, would require a large period of time and a large number of detectors due to the intensity of currently available high-energy photon sources and the low fluorescence cross sections involved in NRF scanning. The increased time and equipment requirements increase the cost of a system. Systems using NRF scanning are more suitable for as secondary inspection systems after a primary inspection system indicates the presence of an item of interest.

Moreover, at least some known NRF scanning systems are further limited when used as secondary inspection systems due to insufficient information necessary for correcting for differential attenuation of the photon beam and the gamma rays emitted from the item of interest subjected to the photon beam. An inability to correct for the attenuation of this information may result in an inaccurate elemental composition determination.

Further, at least some known NRF scanning systems lack a shielding mechanism for the gamma-ray detectors. Because the location of an item of interest is unknown in such systems, a large number of detectors must be used. To include a shielding mechanism, such as an anti-Compton shield, for each detector would be cost-prohibitive. Moreover, because of the number of required detectors in such systems, space constraints preclude the inclusion of a shield for each detector. However, using fewer detectors requires that the NRF scanning configuration be optimized to enable the detectors to receive a maximum intensity of gamma rays emitted by the item of interest. Therefore, a system and/or method is required for optimizing the NRF scanning configuration.

BRIEF DESCRIPTION OF THE INVENTION

In one aspect, a method for inspecting a container for contraband is provided. The method includes scanning the container using computed tomography (CT) to identify a location of an item of interest, determining a nuclear resonance fluorescence (NRF) scan configuration based on the location of the item of interest, positioning the container in the NRF scan configuration, irradiating the item of interest with high-energy photons, detecting gamma rays emitted from the item of interest to generate signals representative of the detected gamma rays, and analyzing the generated signals to determine a presence of contraband.

In another aspect, a scanning system for inspecting an item of interest within a container is provided. The scanning system includes a platform configured to position the container to facilitate minimizing an attenuation of radiation transmitted through the container and to facilitate maximizing a solid angle, and at least one X-ray source including a collimator, wherein the at least one X-ray source is configured to transmit an X-ray beam through the container and the collimator is configured to focus the transmitted X-ray beam on the item of interest. The scanning system also includes at least one X-ray detector configured to generate a signal based on detected radiation transmitted through the container by the at least one X-ray source and at least one gamma-ray detector positioned with respect to the object within the container and configured to detect fluorescent radiation emitted by the item of interest and generate a signal representative of the detected fluorescent radiation.

In another aspect, a method for inspecting contents of a container using X-ray computed tomography (CT) and nuclear resonance fluorescence (NRF) is provided. The method includes positioning the container on a platform, scanning the container with a first X-ray beam from at least one X-ray source, wherein the X-ray beam is transmitted through the container, and identifying a location of an item of interest within the container. The method also includes determining a scan configuration based on the location of the item of interest within the container to optimize NRF signals, repositioning the container based on the determined scan configuration, focusing a second X-ray beam from the at least one X-ray source on the item of interest, detecting gamma-rays emitted by the item of interest by at least one gamma-ray detector, and processing the detected gamma-rays and displaying the results to a user.

BRIEF DESCRIPTION OF THE DRAWINGS

FIGS. 1-8 show exemplary embodiments of the systems and methods described herein. The embodiments shown in FIGS. 1-8 and described by reference to FIGS. 1-8 are exemplary only.

FIG. 1 is a perspective view of an exemplary X-ray computed tomography (CT) scanning system;

FIG. 2 is a perspective view of a portion of the X-ray computed tomography (CT) scanning system shown in FIG. 1;

FIG. 3 is a perspective view of an exemplary X-ray computed tomography (CT) and nuclear resonance fluorescence (NRF) scanning system;

FIG. 4 is a top view of a portion of the X-ray computed tomography (CT) and nuclear resonance fluorescence (NRF) scanning system shown in FIG. 3;

FIG. 5 is a schematic view of a non-optimized scanning configuration of a gamma-ray detector positioned with respect to an object within a container;

FIG. 6 is a schematic view of an optimized scanning configuration of a gamma-ray detector positioned with respect to an object within a container;

FIG. 7 shows a flow chart for an exemplary method for performing a scan using X-ray computed tomography (CT) and nuclear resonance fluorescence (NRF); and FIG. 8 shows a flow chart for the signal processing steps included in the method shown in FIG. 7.

DETAILED DESCRIPTION OF THE INVENTION

Figure 1:
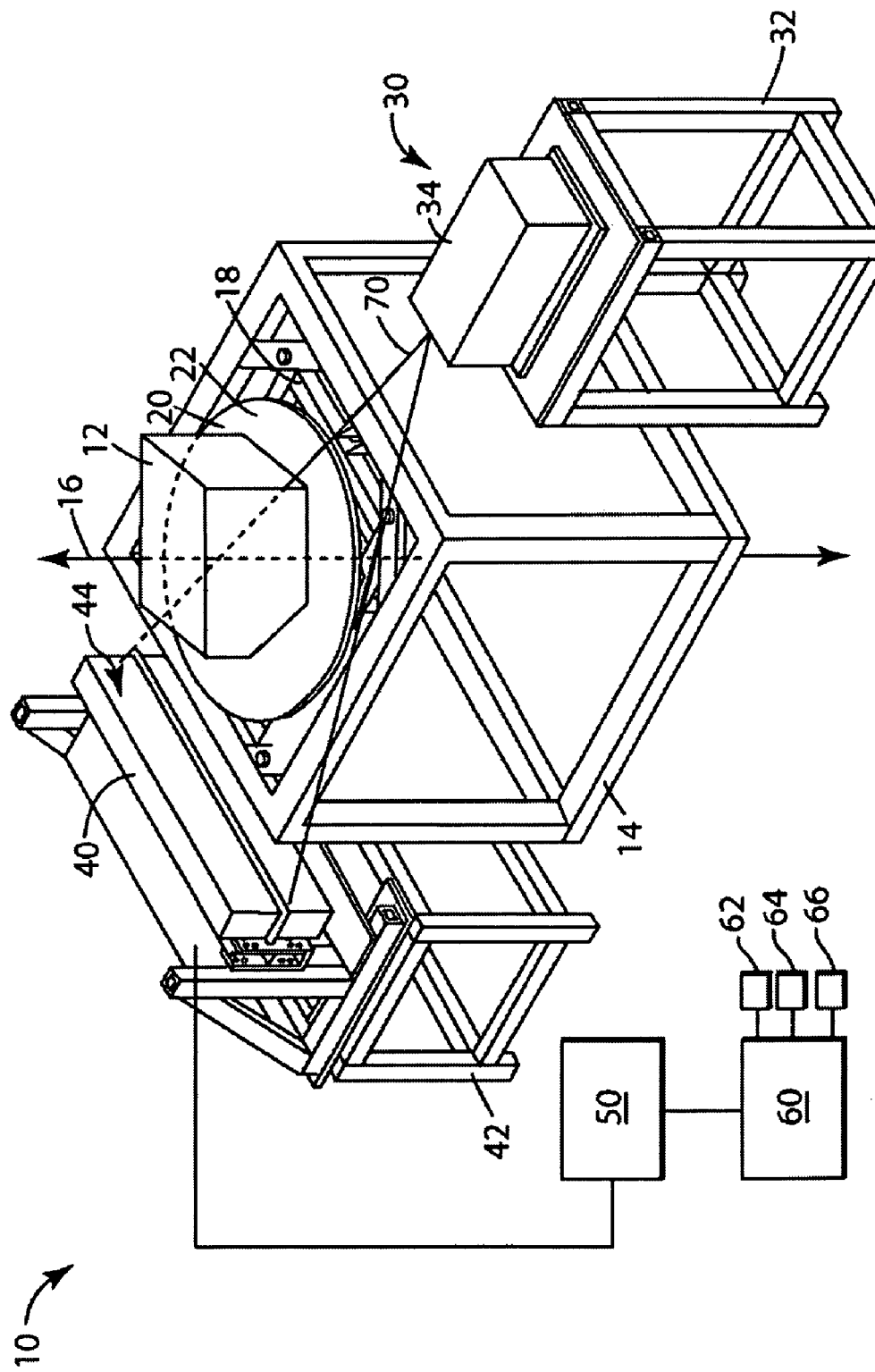

One aspect of the present invention provides a system and method for effectively inspecting cargo for the presence of contraband including, without limitation, explosive material, nuclear material, and/or shielding material. In one embodiment, a combined X-ray computed tomography (CT) and nuclear resonance fluorescence (NRF) scanning system is utilized to facilitate inspecting cargo for contraband. An X-ray CT scanning system is employed having system characteristics, such as spatial resolution, penetration, scanning, and/or reconstruction speeds, that can be tailored for the detection of items of interest within a cargo container. Additionally, an NRF scanning system is employed having system characteristics that can be tailored for further examination of such items of interest in order to confirm an item of interest as potential contraband for further processing or to clear the item of interest. In a particular embodiment, the scanning system may include localized shielding to minimize facility requirements and/or a conveyor or other suitable transport mechanism operatively coupled to the scanning system to facilitate moving the cargo through the scanning system.

The technical effect of the system and method is to provide a three dimensional density image of a container and an elemental map of the item of interest. This information is used to infer automatically (without user intervention) the presence of explosive material, nuclear material, shielding material, or other contraband. Further, such information can also be used for visual inspection and/or determination of a type of contraband within the object. Alternatively, or in addition, user inspection and/or on-screen resolution can also be incorporated to detect or confirm a presence of explosive material, nuclear material, and/or other contraband and for cargo manifest verification. The system's spatial resolution facilitates detecting small explosives that pose a threat to aviation security while also detecting nuclear material and/or shielding material.

At least one embodiment of the present invention is described below in reference to its application in connection with and operation of a system for inspecting cargo crates, pallets, and/or containers. However, it should be apparent to those skilled in the art and guided by the teachings herein provided that the invention is likewise applicable to any suitable system for scanning containers including, without limitation, boxes, drums, and luggage, transported by water, land, and/or air, as well as other containers and/or objects. Further, although embodiments of the present invention are described below in reference to its application in connection with and operation of a system incorporating an X-ray computed tomography and nuclear resonance fluorescence scanning system for inspecting cargo crates, pallets, and/or containers, it should apparent to those skilled in the art and guided by the teachings herein provided that any suitable radiation source including, without limitation, neutrons or gamma rays, may be used in alternative embodiments.

Figure 2:
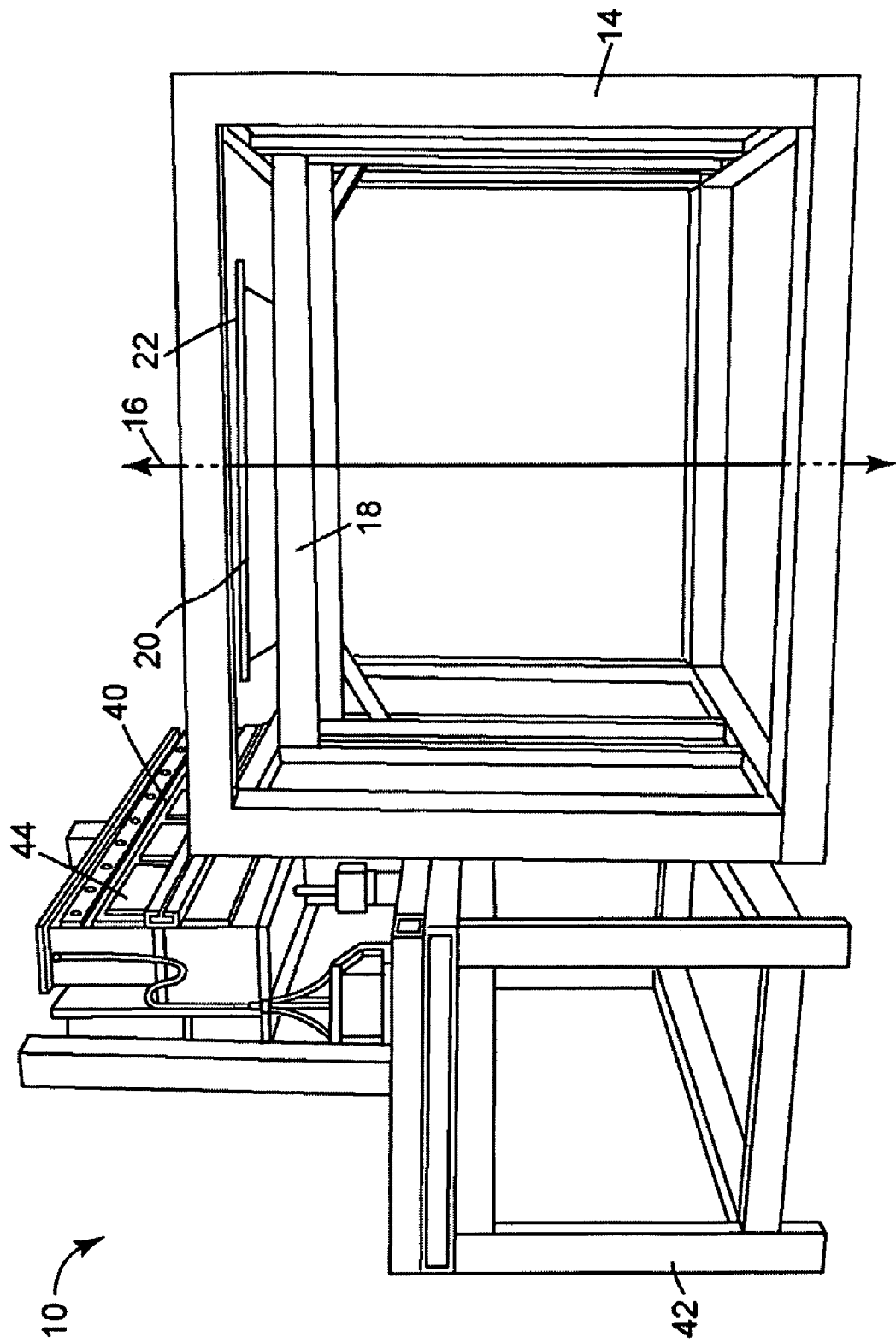

FIG. 1 is a perspective view of an X-ray computed tomography (CT) scanning system 10 for scanning an object, such as a cargo container 12, box, or drum, to identify the contents and/or determine the type of material contained within container 12. FIG. 2 is a perspective view of a portion of system 10 shown in FIG. 1. The term "contents" as used herein refers to any object and/or material contained within container 12 and may include contraband. System 10 includes a base 14 defining a first axis 16. As shown in FIGS. 1 and 2, first axis 16 defines a vertical axis. Base 14 is fabricated of a suitable material that provides sufficient support for the system components and the objects positioned on system 10. A frame 18 is movably coupled to base 14. Frame 18 is movable with respect to base 14 in at least one direction. In one embodiment, frame 18 is movable with respect to base 14 in a direction parallel to first axis 16, e.g., in an upward direction and a downward direction.

System 10 further includes a platform 20 that is rotatably coupled to frame 18. Platform 20 is movable with frame 18 and rotatable with respect to frame 18. In one embodiment, platform 20 is rotatable with respect to frame 18 about first axis 16 in a clockwise or counterclockwise rotational direction and movable with frame 18 with respect to base 14 in an upward direction and a downward direction parallel to first axis 16. As shown in FIGS. 1 and 2, platform 20 forms a surface 22 for supporting container 12.

System 10 includes at least one X-ray source 30, such as a megavolt X-ray generator, fixedly positioned with respect to frame 18 and/or platform 20. In a particular embodiment, X-ray source 30 is fixedly positioned with respect to a first side of frame 18 and/or platform 20. As shown in FIG. 1, X-ray source 30 is mounted to a first tower 32 positioned with respect to base 14. Each X-ray source 30 is configured to transmit at least one beam of radiation, such as a cone beam, through container 12, as described in greater detail below. In one embodiment, a plurality of X-ray sources 30 are positioned, such as fixedly positioned, with respect to platform 20 and configured to emit radiation of different energy distributions. Alternatively, each X-ray source 30 is configured to emit radiation of selective energy distributions, which can be emitted at different times. In a particular embodiment, system 10 utilizes multiple energy inspection to obtain an attenuation map for container 12. In a multiple energy system, such as a dual energy system, a first or low energy source generates radiation having an energy distribution of about 2 MV to about 6 MV and a second or high energy source generates radiation having an energy distribution of about 6 MV to about 20 MV. It should be apparent to those skilled in the art and guided by the teachings herein provided that the first energy source may generate radiation having an energy distribution less than about 2 MV and/or greater than about 6 MV and/or the second energy source may generate radiation having an energy distribution less than about 6 MV and/or greater than about 20 MV.

In addition to the production of CT images, multiple-energy scanning enables the production of density maps and atomic number of the object contents. This information allows for an improved identification of the materials contained in container 12. For example, it allows for accurately distinguishing high-density tungsten from uranium. In one embodiment, the dual energy scanning of container 12 includes inspecting container 12 by scanning container 12 at a low energy and then scanning container 12 at a high energy. The data is collected for the low-energy scan and the high-energy scan to reconstruct the CT, density and/or atomic number images of container 12 to facilitate identifying the type of material or contraband within container 12 based on the material content of container 12, as described in greater detail below.

In an alternative embodiment, X-ray source 30 includes a linear accelerator 34 for producing a pulsed X-ray source. In this embodiment, linear accelerator 34 generates the low energy x-rays and the high energy x-rays in a high speed switching mode or interlaced mode such that container 12 is scanned only one time. This approach allows for higher throughput. In further alternative embodiments, X-ray source 30 includes a suitable electrostatic accelerator, a microtron or a betatron or any other type of X-ray source.

In one embodiment, container 12 is scanned with at least one energy distribution. Following analysis of the images, suspicious areas are selected for a more detailed scan. Improved details are obtained with longer scanning times and/or improved spatial resolution.

At least one X-ray detector 40 is positioned, such as fixedly positioned, with respect to frame 18 and/or platform 20. In one embodiment, X-ray detector 40 is fixedly positioned with respect to a second side of frame 18 and/or platform 20 opposing the platform first side. In a particular embodiment, X-ray detector 40 is mounted to a second tower 42 positioned with respect to base 14, as shown in FIG. 1. X-ray detector 40 is configured to detect radiation emitted from X-ray source 30 and transmitted through container 12. X-ray detector 40 is configured to cover an entire field of view or only a portion of the field of view. Upon detection of the transmitted radiation, X-ray detector 40 generates a signal representative of the detected transmitted radiation. The signal is transmitted to a data collection system and/or processor as described below. In one embodiment, X-ray detector 40 includes a high-energy detector configured to cover container 12 partially or completely and detect radiation energy in an allotted time. In a particular embodiment, X-ray detector 40 includes an array or plurality of two dimensional detector elements to detect X-ray transmission through container 12. Upon detection of the transmitted radiation, each X-ray detector element generates a signal representative of the detected transmitted radiation. The signal is transmitted to a data collection system and/or processor as described below.

System 10 is utilized to reconstruct a CT image of container 12 positioned on surface 22 of platform 20 in real time or non-real or delayed time. In one embodiment, frame 18 is actuated to move with respect to base 14 in a direction parallel to first axis 16, e.g., in an upward direction or a downward direction along first axis 16. Any suitable drive assembly known to those skilled in the art and guided by the teachings herein provided may be operatively coupled to frame 18 to provide such actuation and movement with respect to base 14. As frame 18 moves with respect to base 14, platform 20 rotates with respect to frame 18 about first axis 16. In one embodiment, platform 20 rotates 360 degrees in a first rotational direction with respect to frame 18. Alternatively, platform 20 only partially rotates with respect to frame 18. For example, in a particular alternative embodiment, platform 20 rotates in the first rotational direction about 270 degrees and then reverses direction to rotate in an opposing second rotational direction about 270 degrees. It should be apparent to those skilled in the art and guided by the teachings herein provided that platform 20 may rotate in either rotational direction and/or for any suitable degree of rotation to facilitate scanning container 12, as described in greater detail below. In a further alternative embodiment, container 12 is stationary as system 10 rotates about first axis 16 and/or moves with respect to container 12 parallel to first axis 16.

System 10 is configured to operate in a step-and-shoot mode and a helical mode. In the step-and-shoot mode, system 10 is positioned with respect to container 12 to be scanned, with or without the container rotating and without collecting data. With system 10 in proper position, the data is collected as container 12 is rotated. In one embodiment, container 12 is continuously rotated during the step-and-shot mode. Alternatively, in the helical mode, platform 20 is continuously rotated as frame 18 is translated to collect data.

In one embodiment, one or more X-ray sources 30, mounted to first tower 32 and stationary with respect to platform 20, generate X-ray beams having one or more energy distributions. In a particular embodiment, X-ray source 30 includes a pulsed X-ray source including linear accelerator 34, which generates a low energy source and a high energy source in a high speed switching mode or interlaced mode such that container 12 is scanned only one time. In one embodiment, one or more collimators (not shown) are positioned between X-ray source 30 and container 12 to collimate the X-ray beam emitted from each X-ray source 30 into a suitable beam, such as a cone beam, to reduce excessive radiation that is not used in imaging container 12 and/or to minimize scattered radiation.

X-ray detector 40 detects radiation emitted from X-ray source 30 and transmitted through container 12. X-ray detector 40 generates a signal representative of the detected radiation. In one embodiment, one or more collimators (not shown) are positioned between container 12 and X-ray detector 40 to facilitate preventing or limiting scattered radiation energy from damaging X-ray detector 40.

System 10 facilitates obtaining a large number of precise X-ray views, which are then used to reconstruct a volumetric image of container 12. The image is a mapping of the CT number for each volume element regardless of the superposition of objects or materials within container 12. In one embodiment, an imaging system is coupled to X-ray detectors 40 to process the image data for producing a two-dimensional or three-dimensional map of the container and its contents. The reconstructed images are processed to determine a CT number, density and/or atomic number of container 12 being scanned. Analysis of these images facilitates determining the type of material contained within container 12, for example.

In one embodiment, a data collection system 50 is operatively coupled to and in signal communication with X-ray detector 40. Data collection system 50 is configured to receive the signals generated and transmitted by X-ray detector 40. A processor 60 is operatively coupled to data collection system 50. Processor 60 is configured to produce or generate an image of container 12 and its contents and process the produced image to facilitate determining the material content of container 12. More specifically, in one embodiment data collection system 50 and/or processor 60 produces at least one attenuation map based upon the signals received from X-ray detector 40. Utilizing the attenuation map(s), at least one image of the contents is reconstructed and a CT number, a density and/or an atomic number of the contents is inferred from the reconstructed image(s). When data is collected using a single energy mode, the CT image is analyzed. When data is collected using a multiple energy mode, two or more CT images of the cargo are produced. Based on these CT images, density and/or atomic maps of the cargo can be produced. The CT images, the density and/or atomic number images are analyzed to infer the presence of contraband, such as explosives, special nuclear and shielding materials, and/or to perform cargo manifest verification.

In alternative embodiments, one processor 60 or more than one processor 60 may be used to generate and/or process the container image. In one embodiment, system 10 also includes a display device 62, a memory device 64 and/or an input device 66 operatively coupled to data collection system 50 and/or processor 60. As used herein, the term processor is not limited to only integrated circuits referred to in the art as a processor, but broadly refers to a computer, a microcontroller, a microcomputer, a programmable logic controller, an application specific integrated circuit and any other programmable circuit. The processor may also include a storage device and/or an input device, such as a mouse and/or a keyboard.

X-ray source 30 emits x-rays in an energy range, which is dependent on a voltage applied by a power source to X-ray source 30. A primary beam 70 shown in FIG. 1, such as a fan beam or cone beam, is generated. Primary beam 70 passes through container 12 positioned on platform 20 and X-ray detector 40, positioned on the opposing side of platform 20, measures an intensity of primary beam 70. In one embodiment, X-ray detector 40 measures the x-rays in an energy-sensitive manner by outputting a plurality of electrical output signals dependent on a plurality of energies of x-ray quanta detected from within primary beam 70.

Figure 3:
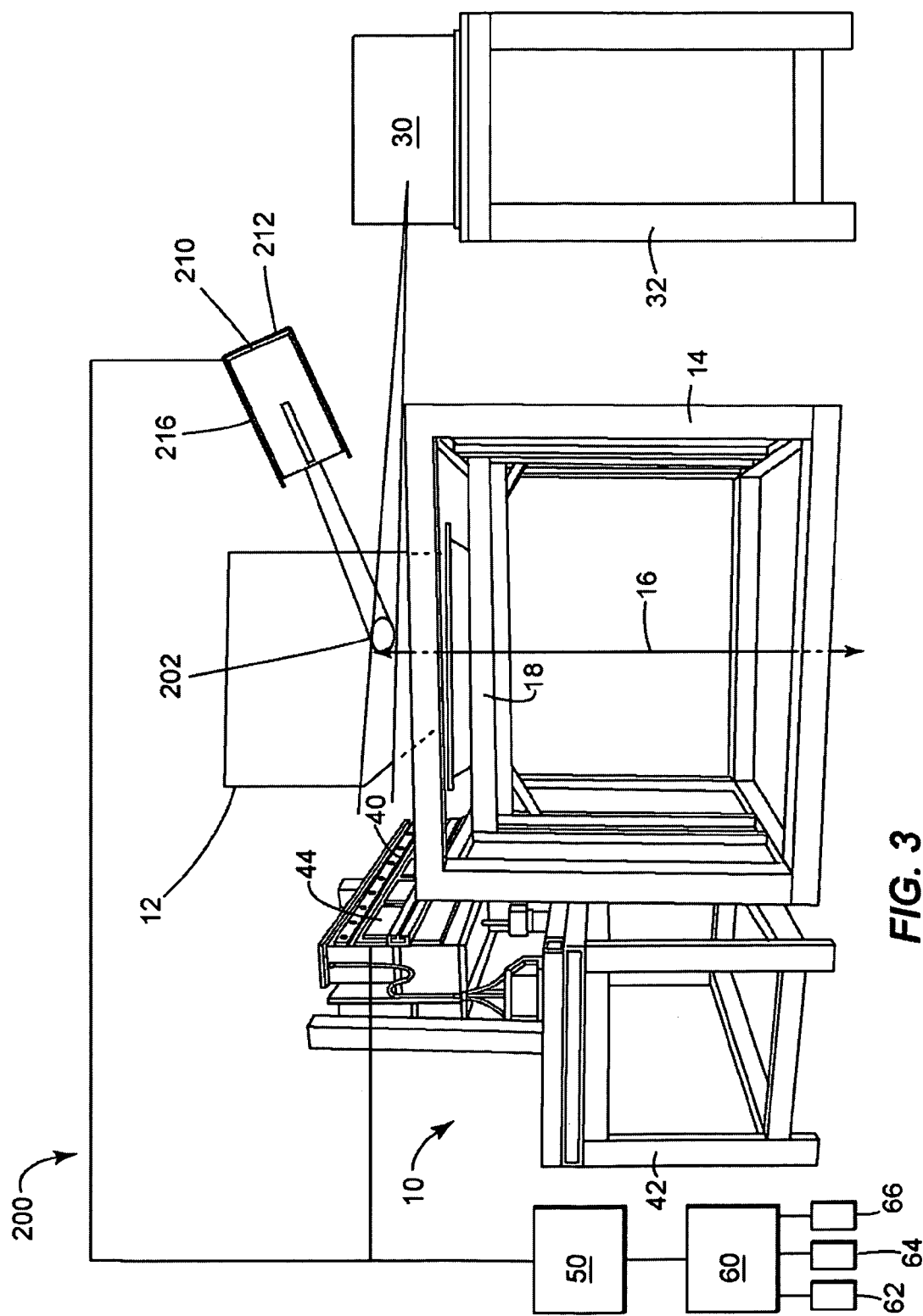
Figure 4:
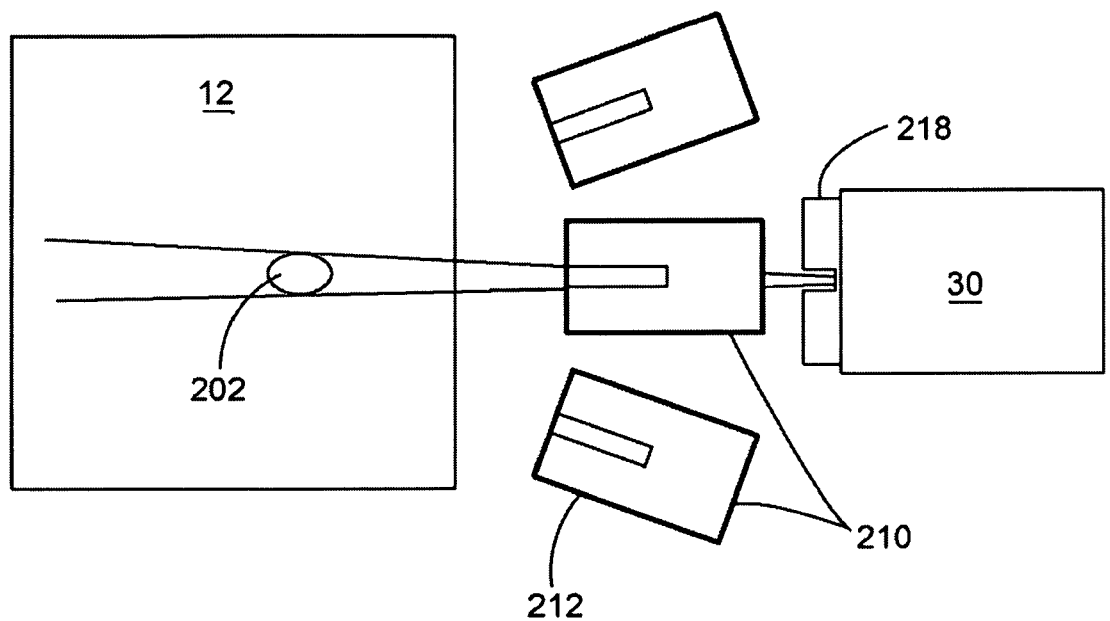

FIG. 3 is a perspective view of an exemplary X-ray computed tomography (CT) and nuclear resonance fluorescence (NRF) scanning system 200 for scanning an item, such as a cargo container 12, box, or drum, to identify the contents and/or determine the type of material contained within container 12. FIG. 4 is a top view of a portion of system 200 shown in FIG. 3. In the exemplary embodiment, X-ray CT and NRF scanning system 200 includes X-ray CT scanning system 10, described above, and, thus, like elements or components are referenced using the same element reference number. X-ray source 30 includes an adjustable collimator 218 that facilitates focusing an X-ray beam at a desired position within container 12. In the exemplary embodiment as shown in FIG. 4, collimator 218 facilitates focusing an X-ray beam such that only an item of interest 202 within container 12 is irradiated by X-ray source 30.

System 200 also includes at least one gamma-ray detector 210. Each gamma-ray detector 210 is focused on item of interest 202 by a mechanical positioning system (not shown). Further, the mechanical positioning system positions each gamma-ray detector 210 to facilitate minimizing a distance between gamma-ray detector 210 and item of interest 202 under investigation, as shown in FIGS. 5 and 6. More specifically, FIG. 5 shows a first or non-optimized NRF scanning configuration and FIG. 6 shows a second or optimized NRF scanning configuration. In the non-optimized NRF scanning system as shown in FIG. 5, a radial distance, R, between gamma-ray detector 210 and item of interest 202 is greater than a radial distance, R', between gamma-ray detector 210 and item of interest 202 in the optimized NRF scanning configuration as shown in FIG. 6. Moreover, a distance, d+L, between X-ray source 30 and item of interest 202 as shown in FIG. 5, is greater than a distance, d'+L, between X-ray source 30 and item of interest 202 as shown in FIG. 6. In this embodiment, L is a constant representation of a distance between container 12 and X-ray source 30. Minimizing distances r', R', and d' facilitates increasing the signal-to-noise ratio (SNR). More specifically, the strength of the gamma-rays emitted by item of interest 202 and detected by gamma-ray detector 210 are proportional to the X-ray source intensity directed at item of interest 202, the X-ray transmission through the path to item of interest 202, the transmission of the gamma-rays from item of interest 202 to detector 210, and the gamma-ray intensity emitted by item of interest 202 and directed at detector 210. Therefore, minimizing the distance between item of interest 202 and detector 210 and between item of interest 202 and X-ray source 30 increases the number of X-rays contacting item of interest 202 by increasing a solid angle and by reducing the attenuation of the X-rays due to the materials in the path towards item of interest 202. Further, increasing the solid angle of detector 210 facilitates decreasing the attenuation of the gamma-rays due to the materials in the path towards detector 210.

Referring again to FIG. 3, in one embodiment of system 200, each gamma-ray detector 210 includes a shield 212. In the exemplary embodiment, the shield 212 is used to reduce the intensity of radiation leaking from the source and hitting detector 210. In one embodiment, detector 210 includes an Anti-Compton shield 216. Anti-Compton shield 216 facilitates reducing the number of events that result in partial energy deposition, further increasing the SNR. In the exemplary embodiment, use of X-ray computed tomography to determine the location of an item of interest 202 allows the use of fewer gamma-ray detectors 210, which allows the use of anti-Compton shields 216.

Figure 7:
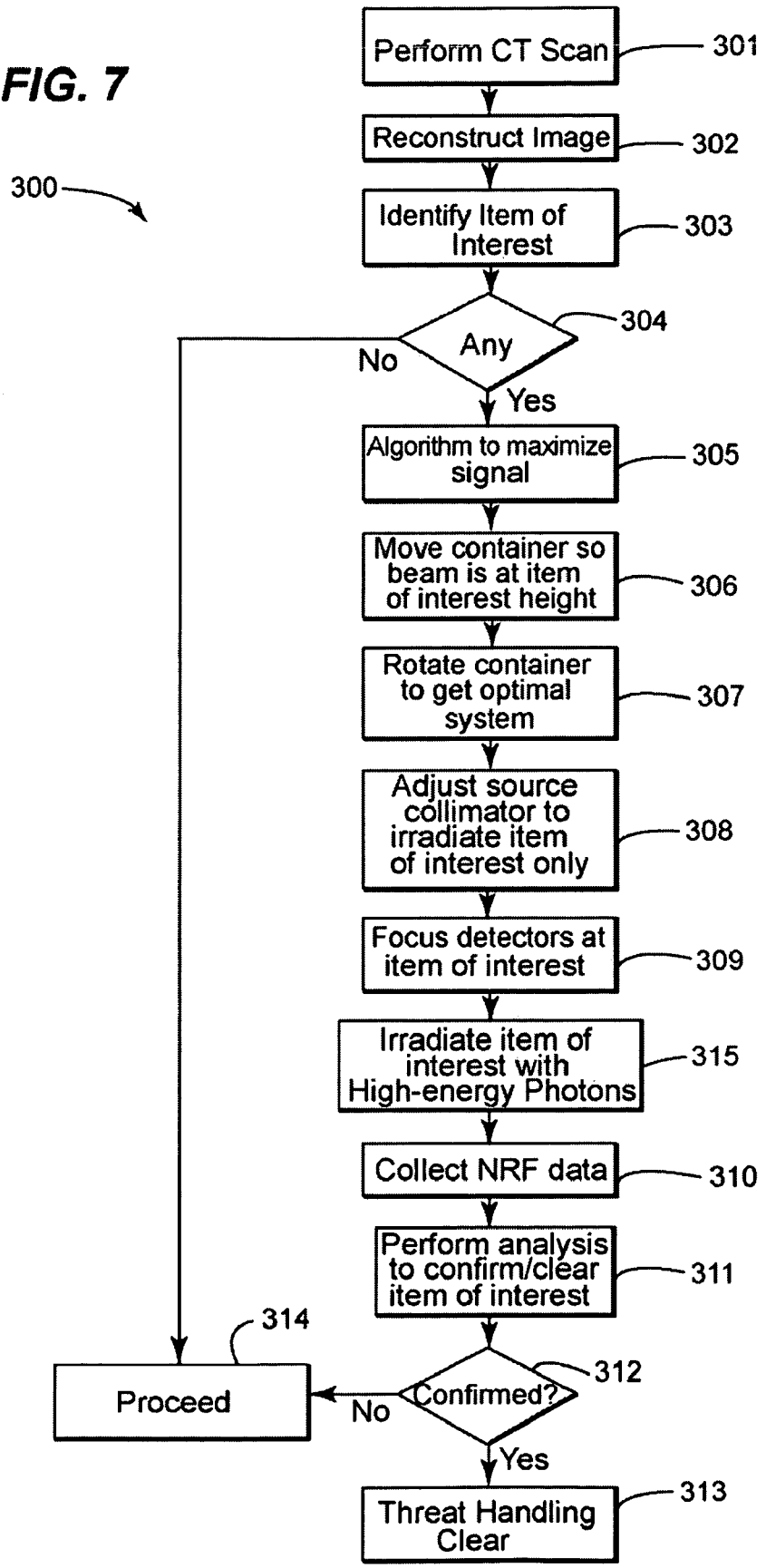

FIG. 7 shows a flow chart for an exemplary method 300 for performing a scan using X-ray computed tomography (CT) and nuclear resonance fluorescence (NRF). During operation, container 12 is scanned 301 using computed tomography. In one embodiment, container 12 is scanned using Megavolt computed tomography (MVCT), wherein a large number of X-ray views are obtained. For example, data collection system 50 and processor 60 receive signals generated by X-ray detector 40 and produce 302 an image of container 12 and its contents. For example, a volumetric CT density image and/or an atomic number image is produced. The image is then analyzed 303 for items of interest 202. If no items of interest 202 are found, container 12 is cleared 314. If an item of interest 202 is found 304, an algorithm is used to determine 305 an optimal nuclear resonance fluorescence (NRF) scan configuration. Platform 22 is then rotated 307 and/or adjusted 306 to the correct alignment and/or height as determined by the algorithm, such that container 12 is positioned at the height of the X-ray beam as transmitted by X-ray source 30. Use of the algorithm also facilitates minimizing a distance, d'+L, as shown in FIG. 6, between item of interest 202 and X-ray source 30 and a distance, R', between object 202 and gamma-ray detector 210. Collimator 36 is then adjusted 308 such that X-ray source 30 irradiates only item of interest 202. A mechanical positioning system (not shown) positions gamma-ray detector 210 at an appropriate distance and focuses 309 detector 210 to facilitate increasing the signal-to-noise ratio of detected gamma-rays. Once all elements are in an appropriate position, X-ray source 30 irradiates 315 item of interest 202 with high-energy photons. The radiation causes item of interest 202 to emit gamma-rays which are then detected by gamma-ray detector 210. Detector 210 generates signals representative of the detected gamma-rays. Data collection system 50 is communicatively coupled to gamma-ray detector 210 and configured to collect 310 NRF data signals from detector 210. Processor 60 performs 311 an analysis on the NRF data signals in order to clear or confirm the composition of object 202. If item of interest 202 is not contraband, it is cleared to proceed 314. The composition of item of interest 202 may otherwise confirm 312 that contraband is present. Item of interest 202 is then subjected 313 to a threat handling protocol including, without limitation, a manual inspection.

Figure 8:
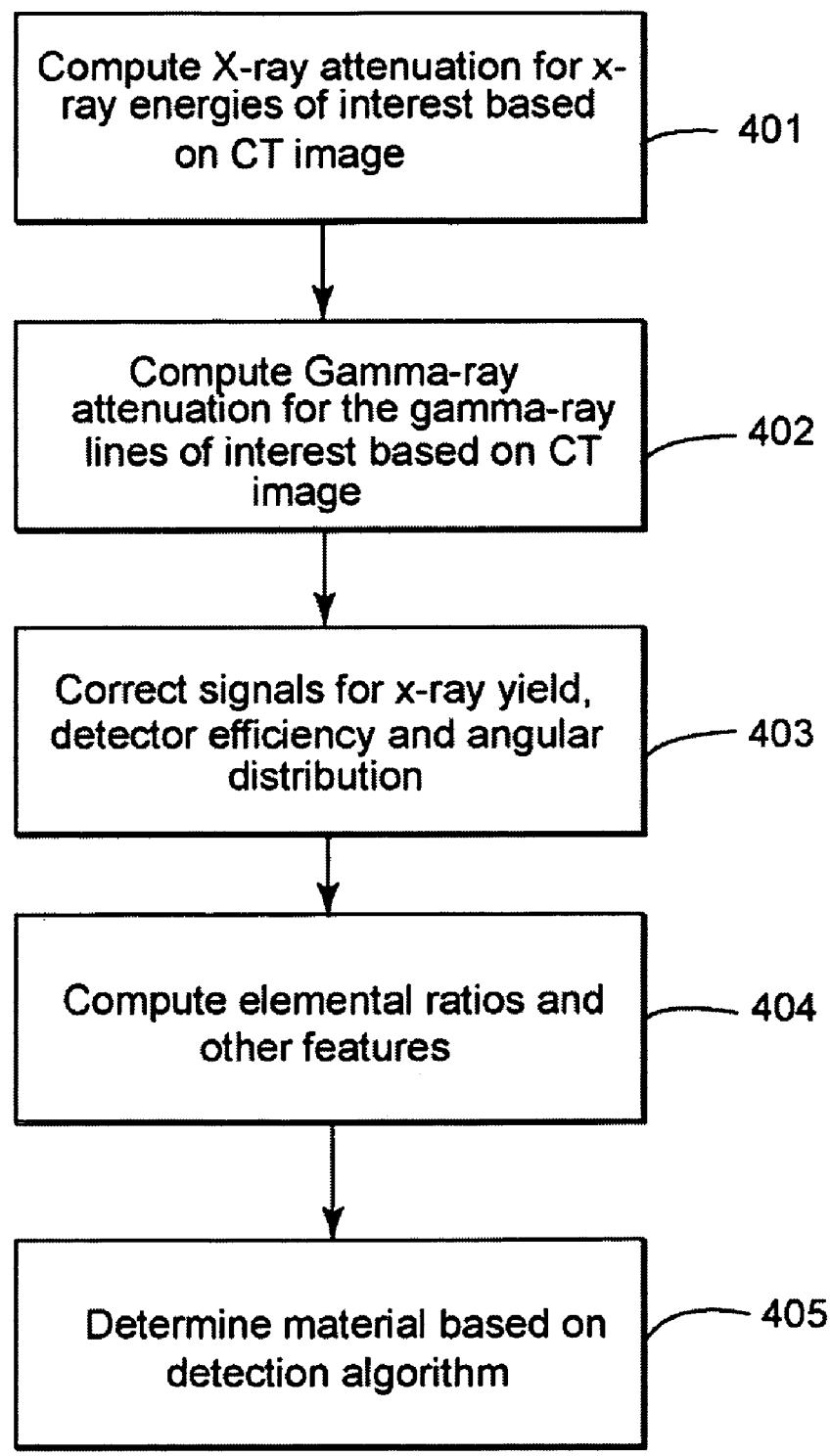

FIG. 8 is a flow chart showing exemplary signal processing steps included in the method described in reference to FIG. 7. More specifically, FIG. 8 shows the signal processing steps taken by processor 60 to analyze the NRF data signals received by data collection system 50. Processor 60 computes 401 an X-ray attenuation for beam energies of interest based on the CT image. Processor 60 also computes 402 an attenuation for gamma-rays of interest based on the CT image. For example, signals for gamma-rays of interest may be corrected for X-ray beam attenuation and gamma-ray attenuation between item of interest 202 and detector 210 based on the CT density image and atomic number image. The signals for gamma-rays of interest are then corrected 403 to compensate for X-ray yield, angular distribution, gamma-ray detector efficiency, and a solid angle. After the signals have been corrected, processor 60 computes 404 elemental data. If item of interest 202 is a single element, such as Uranium, and characteristic gamma rays from item of interest 202 are detected, for example, above a selected threshold, a threat confirmation is displayed for the user and container 12 is subjected to a threat handling protocol. If item of interest 202 is a composite material such as an explosive, processor 60 then determines 405 the material composition of item of interest 202 based on the elemental analysis. The suspect item of interest 202 may then be cleared or confirmed.

The above-described system and method facilitates inspecting cargo containers efficiently and reliably. More specifically, the system and method facilitate effectively inspecting cargo containers using a CT and NRF scanning system to automatically detect contraband and to distinguish the atomic number of materials. Use of CT scanning for a primary inspection facilitates a rapid inspection of a cargo container with moderate specificity to detect items of interest. Use of NRF scanning for a secondary inspection facilitates a highly specific inspection to confirm or clear the presence of items of interest in a cargo container.

Exemplary embodiments of a system and method for inspecting cargo are described above in detail. The system and method are not limited to the specific embodiments described herein, but rather, components of the system and/or steps of the method may be utilized independently and separately from other components and/or steps described herein. Further, the described system components and/or method steps can also be defined in, or used in combination with, other systems and/or methods, and are not limited to practice with only the system and method as described herein.

While the invention has been described in terms of various specific embodiments, those skilled in the art will recognize that the invention can be practiced with modification within the spirit and scope of the claims.

What is claimed is:

1. A method for inspecting a container for contraband, said method comprising:
   scanning the container using computed tomography (CT) to identify a location of an item of interest;
   determining a nuclear resonance fluorescence (NRF) scan configuration based on the location of the item of interest;
   positioning the container in the NRF scan configuration;
   irradiating the item of interest with high-energy photons;
   detecting gamma rays emitted from the item of interest to generate signals representative of the detected gamma rays; and
   analyzing the generated signals to determine a presence of contraband.

2. A method in accordance with claim 1 wherein scanning the container using CT further comprises:
   positioning the container on a platform;
   producing X-ray beams with an X-ray source and transmitting the X-ray beams through the container, the X-ray beams having at least one energy distribution;
   detecting X-ray beams transmitted through the container with at least one X-ray detector configured to generate signals representative of the detected radiation;
   processing the signals generated by the at least one X-ray detector to produce at least one of a CT image and an atomic number image; and
   processing the signals generated by the at least one X-ray detector to determine the location within the container of the suspect item of interest.

3. A method in accordance with claim 2 wherein determining a nuclear resonance fluorescence (NRF) scan configuration further comprises determining a scan configuration such that a first distance from the X-ray source to the item of interest and a second distance from an array of gamma-ray detectors to the item of interest are minimized.

4. A method in accordance with claim 2 wherein positioning the container in the NRF scan configuration further comprises:
   rotating the platform about an axis to a position wherein a first distance from the X-ray source to the item of interest and a second distance from an array of gamma-ray detectors to the item of interest are minimized; and
   moving the platform in a direction parallel to the axis wherein the X-ray source and the item of interest are aligned.

5. A method in accordance with claim 4 wherein irradiating the item of interest further comprises:
   adjusting an X-ray source collimator to irradiate the item of interest; and
   positioning an array of gamma-ray detectors to focus the gamma-ray detectors on the item of interest.

6. A method in accordance with claim 5 wherein analyzing the generated signals further comprises:

processing the signals generated by the at least one X-ray detector to determine X-ray beam attenuation for X-ray energies of interest;

processing the signals generated by the at least one X-ray detector to determine gamma-ray attenuation for gamma-rays of interest;

correcting the signals generated by the at least one X-ray detector to compensate for at least one of X-ray attenuation, gamma-ray attenuation, a solid angle, gamma-ray detector efficiency, and an angular distribution of the emitted gamma rays;

processing the signals generated by the gamma-ray detectors to determine an elemental composition of the item of interest; and processing the elemental composition to confirm or clear the presence of the item of interest.

7. A scanning system for inspecting an item of interest within a container, said scanning system comprising:

a platform configured to position the container to facilitate minimizing an attenuation of radiation transmitted through the container and to facilitate maximizing a solid angle;

at least one X-ray source comprising a collimator, said at least one X-ray source configured to transmit an X-ray beam through the container, said collimator configured to focus the transmitted X-ray beam on the item of interest;

at least one X-ray detector configured to generate a signal based on detected radiation transmitted through the container by said at least one X-ray source; and at least one gamma-ray detector positioned with respect to the object within the container and configured to detect fluorescent radiation emitted by the item of interest and generate a signal representative of the detected fluorescent radiation.

8. A scanning system in accordance with claim 7 wherein said platform is rotatable about an axis and movable in a direction parallel to the axis, said platform rotatably coupled to a frame, said frame coupled to a base and movable in a direction parallel to the axis.

9. A scanning system in accordance with claim 7 wherein said at least one gamma-ray detector comprises an anti-Compton shield.

10. A scanning system in accordance with claim 7 wherein said at least one X-ray source is fixedly positioned with respect to said platform.

11. A scanning system in accordance with claim 7 wherein said at least one X-ray source is configured to selectively transmit an X-ray beam using at least one energy distribution.

12. A scanning system in accordance with claim 7 wherein said at least one X-ray detector is fixedly positioned with respect to said platform.

13. A scanning system in accordance with claim 7 further comprising a processing system communicatively coupled with said at least one X-ray detector and said at least one gamma-ray detector, said processing system configured to receive generated signals from said at least one X-ray detector to produce an image of the container.

14. A scanning system in accordance with claim 13 wherein said processing system further comprises a processor, said processor configured to:

compute X-ray attenuation for X-ray energies of interest based on the image produced by said processing system;

compute gamma-ray attenuation for gamma-rays of interest based on the image produced by said processing system;

correct generated signals from said at least one gamma-ray detector;

compute an elemental composition of the item of interest; and confirm or clear the identification of the item of interest as contraband.

15. A method for inspecting contents of a container using X-ray computed tomography (CT) and nuclear resonance fluorescence (NRF), said method comprising:

positioning the container on a platform;

scanning the container with a first X-ray beam from at least one X-ray source, the X-ray beam transmitted through the container;

identifying a location of an item of interest within the container;

determining a scan configuration based on the location of the item of interest within the container to optimize NRF signals;

repositioning the container based on the determined scan configuration;

focusing a second X-ray beam from the at least one X-ray source on the item of interest;

detecting gamma-rays emitted by the item of interest by at least one gamma-ray detector; and processing the detected gamma-rays and displaying the results to a user.

16. A method in accordance with claim 15 wherein identifying a location of a item of interest within the container further comprises:

detecting radiation that passes through the container using an X-ray detector array;

processing the radiation detected by the X-ray detector array to generate signals representative of the detected radiation;

processing the signals generated by the X-ray detector array to produce at least one of a CT image of the container and its contents and an atomic number image of the container and its contents; and processing the CT image to determine a location of the item of interest.

17. A method in accordance with claim 15 wherein determining a scan configuration based on the location of the item of interest further comprises determining a scan configuration such that at least one of a first distance between the item of interest location and at least one of the X-ray beam source and a second distance between the item of interest location and the at least one gamma-ray detector is minimized.

18. A method in accordance with claim 15 wherein repositioning the container based on the determined scan configuration further comprises:

rotating the platform about an axis to facilitate minimizing a first distance between the item of interest location and at least one of the X-ray beam source and a second distance between the item of interest location and the at least one gamma-ray detector; and moving the platform in a direction parallel to the axis to facilitate aligning the X-ray beam source with the item of interest.

19. A method in accordance with claim 15 wherein focusing an X-ray beam from the at least one X-ray source on the item of interest further comprises:

adjusting an X-ray source collimator to facilitate irradiating the item of interest; and positioning the at least one gamma-ray detector to focus the detectors on the item of interest.

20. A method in accordance with claim 17 wherein processing the detected gamma-rays and displaying the results to a user further comprises:
processing X-ray detector array signals to calculate X-ray beam attenuation for X-ray energies of interest;
processing the X-ray detector array signals to calculate gamma-ray attenuation for gamma-rays of interest; and
compensating for at least one of X-ray attenuation, gamma-ray attenuation, angular distribution, gamma-ray detector efficiency, and a solid angle; and
processing the detected gamma-rays to calculate an elemental composition of the item of interest.

* * * * *